April 25, 1950   L. BRUTOCAO ET AL   2,505,321
SAFETY VALVE
Filed July 1, 1948

INVENTORS
L. BRUTOCAO
A. BRUTOCAO
L. BRUTOCAO

By: Fetherstonhaugh & Co.
ATT'YS

Patented Apr. 25, 1950

2,505,321

UNITED STATES PATENT OFFICE 2,505,321

SAFETY VALVE

Louis Brutocao, Leonard Brutocao, and Angelo Brutocao, Toronto, Ontario, Canada

Application July 1, 1948, Serial No. 36,534

5 Claims. (Cl. 236—61)

This invention relates to safety valves and more particularly to a relief and pressure release valve for steam radiators.

The invention has particular reference to the provision of a valve of this general kind for electric steam radiators to provide a positive measure of safety in the operation thereof and which may be constructed at a reasonably low cost to fit with the character of the radiator. Heretofore in radiators of this particular kind where a safety valve was employed, the construction has been such that if the valve was inadvertently shifted from its normal position it would cease to function thereby creating a hazardous condition. However, the cost of the unit would not warrant the incorporation of a high-cost valve or valves which would positively offset this condition.

It is an object of the present invention to provide a particularly simple air relief and pressure release valve particularly adaptable for electric steam radiators and which may be produced economically.

A further object of the invention is to provide a valve of this kind which may also be applied to other units requiring air relief and pressure release factors wherein the operation of the first-mentioned function is effected by a heat condition.

A further object of the invention is to provide a positively acting air relief and pressure release valve made up of few parts and arranged in such a manner that they will function in a normal manner without a complication of parts which might tend to become inoperative.

With these and other objects in view, the invention consists of a simple valve body having the character of a bushing, formed with a valve seat, the bore of which is designed to receive a slidable sleeve having a valve element seatable on the seat of the bushing, said sleeve having a valve seat, the bore of the sleeve designed to receive a slidable tubular plunger incorporating a valve element seatable on the seat of the sleeve, a means normally retaining the valve element of the sleeve seated and a means normally retaining the valve element of the tubular plunger unseated, with heat reacting means designed to seat the valve element of the plunger under heat conditions, the valve of the sleeve being unseatable under pressure conditions. The valve preferably incorporates a capping element designed to protect the valve openings from foreign matter and from incidental tampering while permitting discharge of air and/or steam from the unit with which the valve is associated. The invention will be fully understood by reference to the following detailed specification taken in conjunction with the accompanying drawings.

Figure 1:
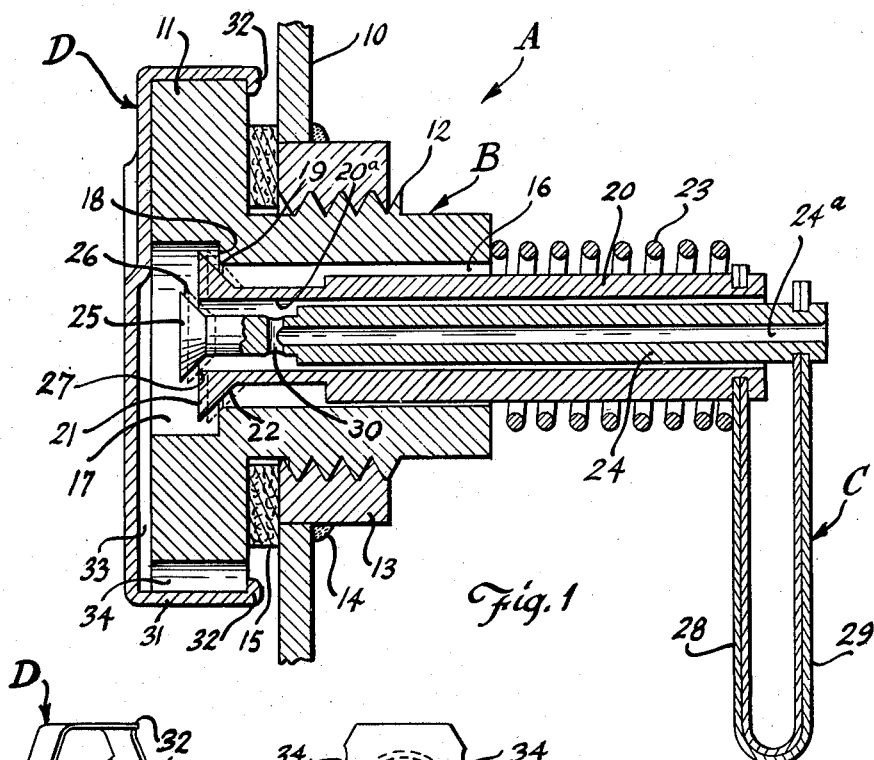
Figure 1 is a longitudinal section taken through the valve approximately along its longitudinal axis and showing in detail the various parts making up the valve as a whole.
Figure 3:
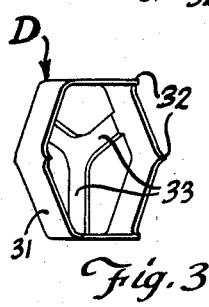
Figure 3 is a perspective view of the preferred form of closure cap for the valve.
Figure 2:
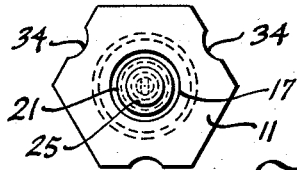
Figure 2 is an end elevation of the valve with the closure cap removed.

Referring to the drawings, A indicates a safety valve unit as a whole, designed to be mounted on the wall 10 of a radiator or the like and partially to project within the latter. The valve is generally made up of a valve body B which is in the general form of a bushing having the enlarged head 11, the bushing being preferably screw threaded as at 12 to cooperate with a suitable nut element 13 which may be welded as at 14 or otherwise secured to the wall 10. Between the head 11, wall 10 and nut element 13, a suitable washer 15 may be provided for practical mounting of the valve unit. The bore 16 of the bushing body B is enlarged as at 17 in the head area of the valve to form an enlarged cavity in the latter designed to establish communication between the interior of the radiator or the like, and the atmosphere. The shoulder 18 formed between the bore 16 and the cavity 17 is formed to provide a valve seat 19.

Within the bore 16 of the body, a slidable sleeve element 20 is disposed having a valve element or head 21 formed with the conical seating surface 22 which is designed to seat upon the valve seat 19. This sleeve is maintained in normal position with the valve seating surface 22 engaging the valve seat 19 (dotted line position, Figure 1) by means of a coil spring 23 which encircles the portion of the sleeve projecting beyond the body B and engages the rear end of body B on the one hand and abuts against a suitable projection carried by the sleeve 20 on the other. The projection may be of any suitable kind to suit the purpose, mainly to hold the seating surface 22 of the valve element 21 against the valve seat 19. Preferably the projection employed is a bimetal spring element C which is carried by the sleeve 20 and the purpose of which will be explained hereinafter.

Within the slidable sleeve a tubular plunger 24 is disposed which is designed in phases of operation to slide relatively to sleeve 20. The tubular plunger is formed at its outer end with a valve element or head 25 formed with the conical valve seating surface 26 designed to engage during phases of operation with the seat 27 which is defined by the intersection of the bore 20a of the sleeve 20 with the outer face of the valve element 21. Normally, valve element 25 is in the open position, but it is designed to be moved to the dotted line position (Figure 1) under heat conditions. In this respect, the bimetal spring C formed with the opposed arms 28 and 29 is designed to close valve element 25. The arm 28 is, as shown, anchored on the sleeve 20 while the arm 29 is anchored to the inner end of the tubular plunger 24. The spring arms are positioned so that the valve 25 will normally be open. However, under heat conditions which will cause the arm 29 to spread away from arm 28, it is obvious that this action will cause valve 25 to seat on the valve seat 27, thus closing the bore 20a of sleeve 20 from communication with the atmosphere. When this valve unit is mounted in a radiator or the like, it will be obvious that as heat is developed in the radiator, air contained therein will commence to discharge from the radiator through the bore 20a of the sleeve 20 and through the bore 24a of the plunger 24. The bore 24a opens on the inner end of the plunger 24 to the interior of the radiator and at its opposite end bore 24a intersects the transverse passage 30 formed in the plunger which communicates with the bore 20a of the sleeve 20. The purpose of the passage through the plunger 24 from the projecting end thereof to the section having a reduced area immediately behind the valve head is, of course, to permit the free escape of air from the radiator when the valve 25 is unseated. However, when the head in the radiator reaches a predetermined degree, the effect of this heat on the bimetal spring C will cause the arm 29 thereof to swing away from arm 28 and thereby close the exit port controlled by the valve element 25.

Figure 4:
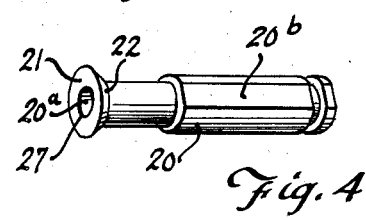
Figure 4 is a perspective detail of the slidable sleeve of the valve and valve element therefor.
Figure 5:
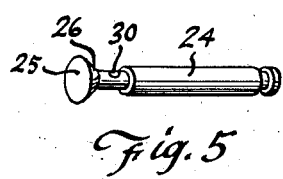
Figure 5 is a perspective detail of the slidable tubular plunger and valve element therefor designed to cooperate within the slidable sleeve.
Figure 6:
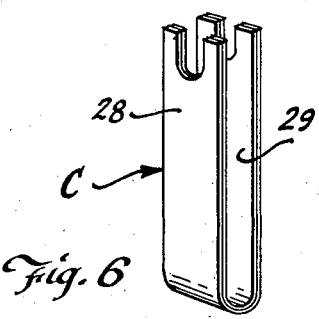
Figure 6 is a perspective detail of the bimetal spring designed to actuate the slidable tubular plunger under heat conditions.

As the heat increases within the radiator and steam pressure is created (in the case of a steam radiator) any excess pressure developed will be relieved through the unseating of valve element 21. In this instance, spring 23 normally causing valve element 21 to be seated, has a selected pressure value to maintain normal pressure only in the radiator, and above this the pressure exerted on the valve head 21 from within the radiator will cause compression of spring 23 and the unseating of valve element 21, thus to permit excess pressure to escape via the bore 16 of the valve body B. In this instance, a portion or portions of the surface of the sleeve 20 may be flattened as at 20b (Figure 4) to provide a reasonable passage between the sleeve and the bore 16 of the valve body.

While the cavity 17 of the head of the valve body may be freely open to the atmosphere, we prefer to have this cavity fully covered in order not only to eliminate a great deal of foreign material from the cavity which might tend to impair the action of the valves, but to avoid as well as possible, tampering with the valves by inexperienced people which might impair the normal working characteristics of the valve. Therefore, we cover the enlarged head 11 of the valve body 8 with a cover element D in the form of a cap which is flanged as at 31 and may be clinched as desired, by bending the lugs 32 over the rear edge of the head 11. This cap is pressed to form in its inner surface, the grooves or air channels 33 which are in communication with the cavity 17 and serve to discharge air, steam, or the like from cavity 17 through to suitable notches 34 formed in the side faces of the head 11. Consequently, free discharge of air, steam, or the like, is provided for while the valves and valve seats are adequately protected by cap D.

It will be obvious from the foregoing that we have provided a very simple unit effective in particular by the safe operation of radiators and particularly steam radiators. The action of the valve is automatic, air being permitted to discharge from the radiator as the radiator commences to heat which thus increases the efficiency of the radiator and permits quicker heating. The air outlet is then automatically closed as the heat increases and abnormal pressure conditions which may develop are immediately relieved through the automatic pressure response action of the valve element 21 and its co-acting spring 23.

It is obvious that the unit is simple of manufacture, and that it is easily installed, and may be readily removed for repair or inspection as may be required. Moreover, the unit is such that the valve may be manufactured economically.

The valve has a particular application in the case of electric steam radiators formed from sheet metal which will contribute to their efficient operation and avoid the possibility of bulging of the sections through excess pressure, as well as any possible danger of disintegration by this cause. However, it is obvious that the use of the valve is not confined only to radiators of this kind.

What we claim our invention is:

1. A relief valve particularly designed for radiators comprising, a valve body having a bore opening at each end of the body, a slidable sleeve disposed within the bore having a valve head at one end, a valve seat formed at one end of the bore of the body designed normally to receive said valve head in engagement therewith to close the bore, said sleeve projecting from the bore beyond the opposite end of the body, a coil spring surrounding the projecting end of said sleeve abutting one end of the body, and means in connection with the sleeve for engaging the opposite end of the spring for transmitting the pressure of the spring to the sleeve and holding said valve head seated, a slidable plunger disposed within said sleeve having a valve head at one end, the bore of said sleeve defining a valve seat for the valve head of the sleeve, said valve head of the plunger cooperating with the valve seat of the sleeve, said plunger projecting beyond the opposite end of said sleeve, said plunger being formed with a section of reduced cross sectional area immediately behind said valve head and with passage means extending from said section of reduced cross sectional area to said projecting end, a bi-metal substantially U-shaped spring having opposed arms, one arm being mounted on said sleeve, the other arm being connected with the projecting end of said plunger, said arms normally being disposed to maintain the valve head of said plunger unseated, said bi-metal spring reacting to predetermined temperature to cause said plunger to move relatively to said sleeve and to seat the valve head of said plunger, said coil spring being of predetermined pressure value and designed to cause unseating of said sleeve valve head when the latter is subjected to a pressure value beyond that of the spring.

2. A relief valve particularly designed for radiators as claimed in claim 1 in which the valve body is formed with a head having a cavity designed to communicate with the bore of the valve body and the bore of the sleeve, the valve heads of the sleeve and plunger being within said cavity.

3. A relief valve particularly designed for radiators as claimed in claim 1 in which the valve body is formed with a head having a cavity designed to communicate with the bore of the valve body and the bore of the sleeve, the valve heads of the sleeve and plunger being within said cavity, and a cover element for the enlarged head of said valve body designed to enclose said cavity, the cover being formed with at least one channel extending across the inner face thereof and in communication with said cavity and means in connection with said enlarged head forming a passage and designed to communicate between said channel of said cover and the atmosphere.

4. A relief valve particularly designed for radiators as claimed in claim 1 in which the valve body takes the form of a bushing-like element, said bushing being formed with external threading designed to mate with a screw-threaded cavity provided in a radiator or the like.

5. A relief valve for radiators comprising a valve body having a bore therethrough with a valve seat formed therein, a valve stem reciprocable within said bore, said valve stem having a valve head which co-operates with said seat of said bore, said valve stem being further formed with a passage that connects with the interior of a radiator on which said valve is mounted and with the atmosphere, valve means for closing said passage, temperature responsive means for holding said latter mentioned valve means open until a predetermined temperature is reached within the radiator on which said relief valve is mounted, and pressure responsive means within said radiator on which said relief valve is mounted for retaining said first mentioned valve head closed until the predetermined pressure is built up within said radiator, said valve means for closing said passage in said valve stem comprising a plunger reciprocable within said passage, said plunger being formed with a valve head, a section of a reduced cross section immediately behind said head and a passage extending therethrough from said reduced cross section to the end opposed to said valve head.

LOUIS BRUTOCAO.
LEONARD BRUTOCAO.
ANGELO BRUTOCAO.

REFERENCES CITED

The following references are of record in the file of this patent:

UNITED STATES PATENTS

| Number | Name | Date |
|---|---|---|
| 751,853 | Hoffman | Feb. 9, 1904 |
| 998,033 | O'Brien | July 18, 1911 |
| 1,109,174 | Peterson | Sept. 1, 1914 |
| 2,112,665 | Dube | Mar. 29, 1938 |